Oct. 27, 1925.
F. P. PRINDLE
1,559,452
AUTOMOBILE STEERING CONNECTION AND METHOD OF MAKING THE SAME
Filed June 15, 1922
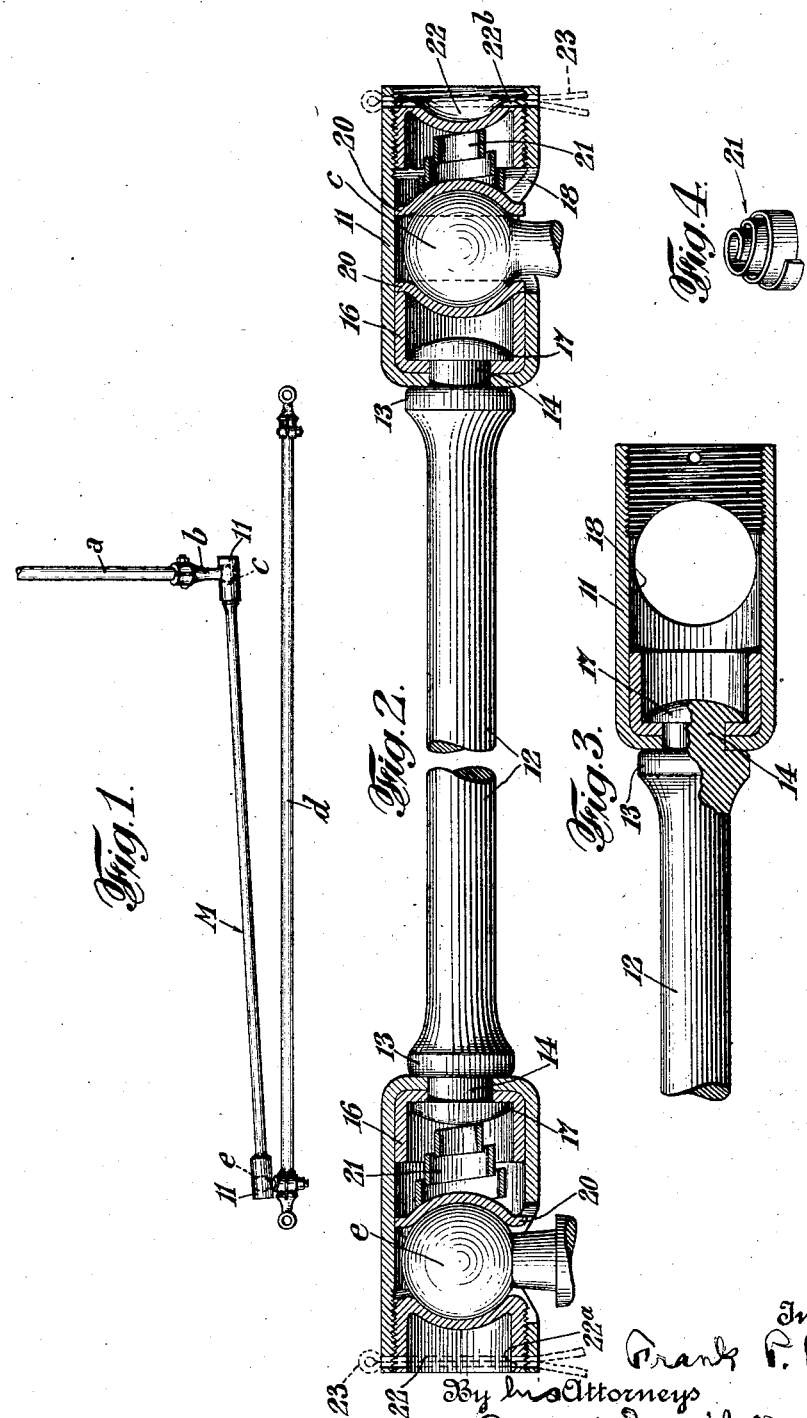
Inventor
Frank P. Prindle,
By his Attorneys
Prindle, Wright & Small.

Patented Oct. 27, 1925.

1,559,452

UNITED STATES PATENT OFFICE.

FRANK P. PRINDLE, OF NEW BRITAIN, CONNECTICUT, ASSIGNOR TO THE STANLEY WORKS, A CORPORATION OF CONNECTICUT.

AUTOMOBILE STEERING CONNECTION AND METHOD OF MAKING THE SAME.

Application filed June 15, 1922. Serial No. 568,412.

*To all whom it may concern:*

Be it known that I, FRANK P. PRINDLE, a citizen of the United States, a resident of New Britain, in the county of Hartford and State of Connecticut, have invented a certain new and useful Improvement in Automobile Steering Connections and Methods of Making the Same, of which the following is a specification.

This invention relates to steering connections for automobiles, and more particularly to the drag links and ball and socket arrangements thereof. The object of the invention is to provide a structure of this sort which is simple in construction, economic in manufacture, and strong, durable and efficient in use.

In the accompanying drawings, wherein the preferred embodiment of the invention is shown,—

Figure 1 is a view of a steering connection in which the improvements of the present invention are incorporated;

Fig. 2 is a view of a drag link, the ball and socket arrangements on the ends thereof being in central longitudinal section;

Fig. 3 is a central longitudinal section through one end of the drag link, the removable parts within the socket member thereof being omitted, and Fig. 4 is an elevational view of a spring employed in each of the ball and socket connections.

In the arrangement shown in Fig. 1, which is merely disclosed to illustrate one application of the present invention, *a* is the steering post carrying at its lower end a steering arm *b* provided with a ball *c; d*, a connecting rod having a yoke member at each end adapted to be pivotally secured to the knuckles of the steering wheels; *e*, a ball carried by the connecting rod *d*, and M designates the drag link having at each end a socket member 11 adapted to receive balls *c* and *e*, as hereinafter described more in detail.

The construction of the drag link M forms an important feature of the present invention. This drag link includes a rod 12 having at each end an abutment or rib 13 and a projecting stud 14. Preferably, the rod 12 is of wrought metal and is constructed from a rod of like diameter throughout its length. The ribs 13 by preference are formed by swaging, this being accomplished, if desired, by applying a pair of dies to opposite sides of the portion to be swaged and then bringing the dies together to head up the portion between the dies. The numeral 11 designates a socket member preferably constructed of wrought metal and formed by stamping out a blank and then drawing the same to the shape shown. The end wall of this socket member has an opening which closely receives the projecting stud 14. The numeral 16 designates a reinforcing cup preferably of wrought metal and formed by stamping and drawing operations. This reinforcing cup, which is of such size and shape as to fit snugly within the closed end of the socket member 11, has an opening in its closed end adapted to closely receive the stud 14. The socket member and the cup are secured on the stud 14 by heading the outer end of the latter, as at 17. This heading operation is such that the end walls of the socket member and the cup are tightly clamped or jammed between the head 17 and the shoulder or rib 13 thereby obtaining great rigidity and strength. The cup 16 is of advantage in that it reinforces the socket member, facilitates securing the latter in position on the stud 14, and the edge thereof may form a seat for a bearing member, as hereinafter described. In the side wall of the socket member is an opening 18 through which is inserted the ball *c* or the ball *e*, as the case may be.

The ball and socket connections at the ends of the drag link also have features of novelty and advantage. Within each of the socket members 11 is, at least, one bearing member 20 in the form of a concavo-convex disk engaging the ball, a spiral spring 21 resiliently maintaining the disk 20 against the ball, and a nut 22 threaded into the open end of the socket member. In the arrangement on the left-hand end of the drag link, the closed end of the nut 22 and the disk 20 form a socket, so to speak, for the ball *e*, the spring 21 being positioned between the disk 20 and the closed end of the socket member 11. In the arrangement on the right-hand end of the drag link, the ball *c* is positioned in the socket formed by a pair of disks 20, one of these disks being seated against the shoulder provided by the outer end of the cup 16 and the other disk being resiliently urged against the ball by the spiral spring 21 positioned within the nut 22. As herein shown, the spring 21 is formed from a strip of metal rectangular in cross section wound into a spiral with each successive convolution partly within the next preceding convolution and with the width of the strip extending generally in the direction of the axis of the spring. A spring of this kind is of advantage in that it is extremely strong and takes up but very little space. The nuts 22 are preferably formed by drawing a piece of sheet metal to the shape shown, the closed end of the nut being dished so that it may form a spherical bearing surface for a ball. When the nut 22 is to be used as shown in the left-hand side of Fig. 2, the kerf 22ª is in the skirt of the nut, and when used as shown in the right-hand side the kerf 22ᵇ is in the closed end of the nut, said kerfs being for the purpose of receiving cotter pins 23 (shown by dotted lines Fig. 2) which may be employed to prevent accidental displacement of the nuts 22.

It is, of course obvious that the invention is susceptible of various modifications and changes which are within the spirit of the invention without departing from the scope of the following claims, it being understood that the present disclosure of the invention is by way of illustration only and it is not to be taken as restrictive of my conception.

I claim:—

1. In a drag-link for use in automobile steering connections, a socket member, a ball therein, a bearing member for said ball, and a spring behind said bearing member comprising a strip of metal rectangular in cross section wound into spiral shape with each successive convolution partly within the preceding one and the greatest cross sectional dimension of the strip extending generally in the direction of the axis of the spring.

2. In a drag-link for use in automobile steering connections, a socket member, a ball therein, a bearing member a spring resiliently maintaining said bearing member against said ball, and a nut having an externally threaded cylindrical skirt portion and a closed end dished to form a spherical bearing face for the ball.

3. In a ball and socket connection, an internally threaded socket member, a ball and a spring therein, and a nut having an externally threaded, cylindrical skirt portion screwed into said socket member and also having a dished end whereby said nut is reversible end for end to form an abutment for said spring or a bearing surface for said ball.

4. In a drag-link for automobile steering connections, a bearing-containing member, and a ball bearing consisting of a piece of dished sheet metal.

5. In a drag-link for automobile steering connections, a bearing-containing member, and a bearing contained therein consisting of a piece of sheet metal having a dished portion to form the bearing, and a skirt extending around the edge of said dished portion.

6. In a drag-link for automobile steering connections, a bearing-containing member, and a ball bearing consisting of a piece of dished sheet metal, and a spring adapted to hold said bearing against a ball.

7. In a drag-link for automobile steering connections, a bearing-containing member, a bearing contained therein, a part consisting of a piece of sheet metal having a dished portion, and a skirt extending around the edge of said dished portion, and a spring adapted to hold said first mentioned bearing against a ball, said spring being nested within said skirt.

8. In a drag-link for automobile steering connections, a bearing-containing member, a ball bearing consisting of a piece of dished sheet metal, and a volute spring adapted to hold said bearing against a ball.

9. In a drag-link for automobile steering connections, a bearing-containing member, and a ball bearing consisting of a piece of dished sheet metal, and a volute spring adapted to hold said bearing against a ball, said spring being formed of a strip whose greatest cross-sectional dimension extends generally in the direction of the axis of the spring.

10. In a drag-link for automobile steering connections, the combination of a bearing-containing member, and opposite bearings consisting of dished pieces of sheet metal.

11. In a drag-link for automobile steering connections, the combination of a bearing-containing member, and complemental bearings consisting of dished pieces of sheet metal, one of said bearings having a skirt formed around its edge.

12. A ball crank joint, comprising a ball member and a metallic socket member having the brain of the metal substantially parallel to its bearing face.

13. A ball crank joint, comprising a ball member and a metallic socket member having the grain of the metal substantially parallel to its bearing face, said socket member having a bent-over tubular marginal portion constituting a plug for fitting within a socket.

14. A ball crank joint comprising a ball member and a metallic sheet metal socket member, having the grain of the metal substantially parallel to its bearing face.

In testimony that I claim the foregoing, I have hereunto set my hand this 6 day of June, 1922.

FRANK P. PRINDLE.